United States Patent
Koschinat

(10) Patent No.: US 8,118,372 B2
(45) Date of Patent: Feb. 21, 2012

(54) WHEEL HUB ARRANGEMENT

(75) Inventor: Hubert Koschinat, Hosbach (DE)

(73) Assignee: SAF-HOLLAND, GmbH, Bessenbach-Keilberg (DE)

( * ) Notice: Subject to any disclaimer, the term of this patent is extended or adjusted under 35 U.S.C. 154(b) by 31 days.

(21) Appl. No.: 12/158,564

(22) PCT Filed: Dec. 20, 2006

(86) PCT No.: PCT/EP2006/012308
§ 371 (c)(1),
(2), (4) Date: Jun. 20, 2008

(87) PCT Pub. No.: WO2007/079945
PCT Pub. Date: Jul. 19, 2007

(65) Prior Publication Data
US 2008/0290722 A1    Nov. 27, 2008

(30) Foreign Application Priority Data
Dec. 22, 2005  (DE) .................. 10 2005 062 095

(51) Int. Cl.
*B60B 27/00* (2006.01)
*F16C 19/52* (2006.01)

(52) U.S. Cl. .................. 301/108.1; 301/124.1; 116/216; 384/448

(58) Field of Classification Search ............... 301/108.1, 301/108.2, 108.3, 108.4, 108.5, 124.1; 246/169 A; 116/216, 217, 218, 221; 384/544, 448, 624; 340/584; 374/187
See application file for complete search history.

(56) References Cited

U.S. PATENT DOCUMENTS

| | | | | |
|---|---|---|---|---|
| 2,065,614 A * | 12/1936 | Scribner | ................ | 116/214 |
| 2,280,755 A * | 4/1942 | Hexamer | ................ | 116/214 |
| 2,694,997 A * | 11/1954 | Alger, Jr. | ................ | 116/106 |
| 2,753,270 A * | 7/1956 | Di Renzo | ................ | 116/216 |
| 3,569,695 A * | 3/1971 | McLean | ................ | 246/169 A |
| 3,893,690 A | 7/1975 | Yapp | | |
| 4,947,786 A * | 8/1990 | Maynard et al. | ................ | 116/218 |
| 5,315,954 A * | 5/1994 | Richmond | ................ | 116/67 R |
| 5,833,371 A * | 11/1998 | Gomez et al. | ................ | 384/448 |
| 6,203,114 B1* | 3/2001 | Ehrlich | ................ | 301/124.1 |
| 6,546,892 B2* | 4/2003 | Kelly et al. | ................ | 116/216 |
| 6,759,963 B2* | 7/2004 | Hayes | ................ | 340/584 |
| 7,185,955 B2* | 3/2007 | Dombroski | ................ | 301/108.1 |
| 2005/0156463 A1* | 7/2005 | Hennig et al. | ................ | 301/124.1 |

FOREIGN PATENT DOCUMENTS

| | | |
|---|---|---|
| DE | 19963295 A1 | 8/2000 |
| DE | 10242199 A1 | 3/2004 |
| WO | 01/45993 A1 | 6/2001 |

* cited by examiner

*Primary Examiner* — Kip T Kotter
(74) *Attorney, Agent, or Firm* — Price Heneveld LLP

(57) ABSTRACT

The invention relates to a wheel hub arrangement (1) having at least one wheel hub (2) which is mounted rotatably via at least one wheel bearing (3) on a bearing journal (4) of an axle body (5) which is mounted on a vehicle chassis. Furthermore, the wheel hub arrangement (1) can have a brake system (6). The bearing journal (4) is assigned a display device for displaying critical temperature loading of the wheel bearing (3) and/or the brake system (6), wherein this display device has a display element which responds when critical temperature loading is exceeded.

13 Claims, 3 Drawing Sheets

WHEEL HUB ARRANGEMENT

Figure 1:
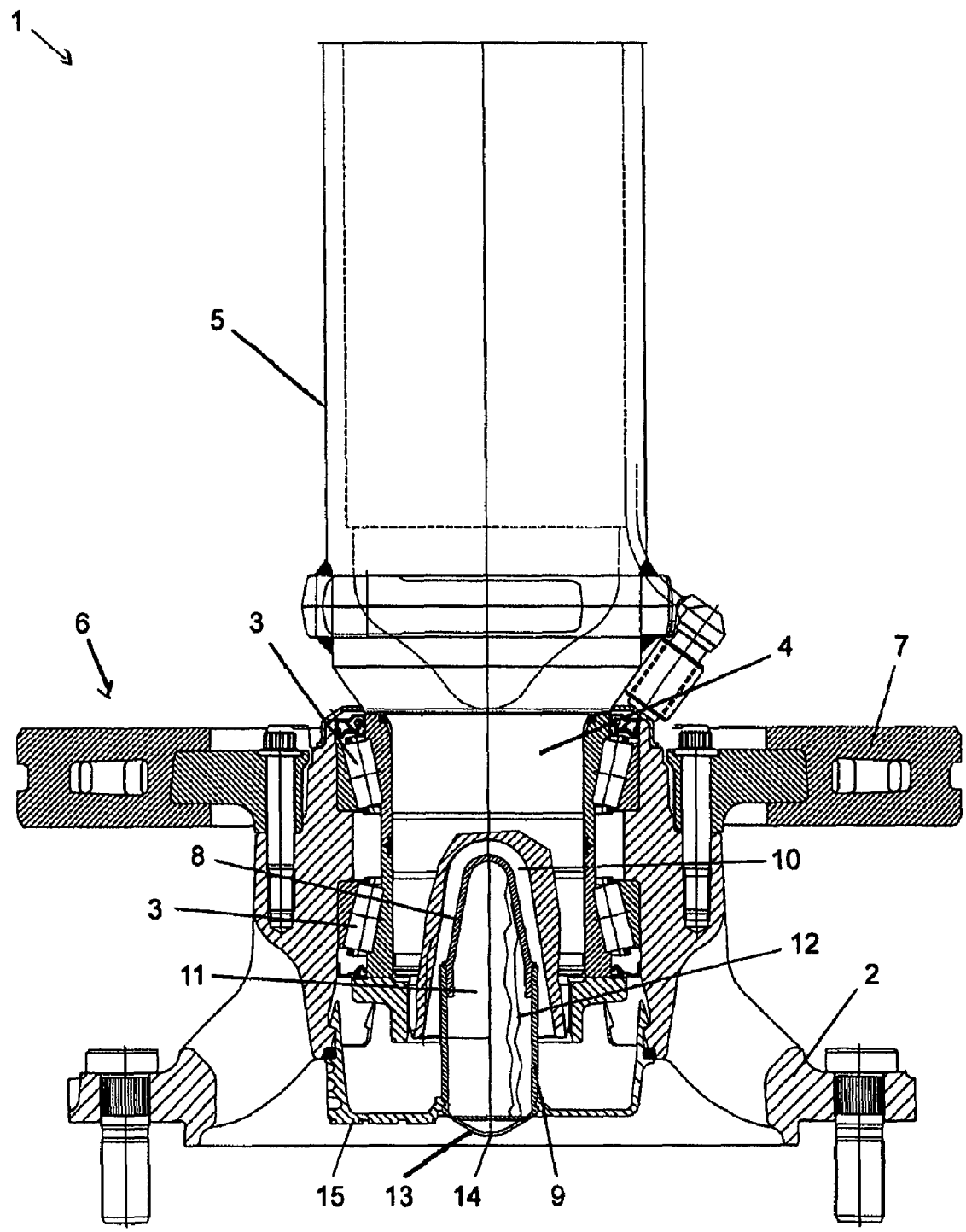

The invention relates to a wheel hub arrangement with at least one wheel hub, which is bearing supported via at least one wheel bearing rotatably on an axle [journal] end of an axle beam articulated on a motor vehicle chassis and with which optionally a brake system is associated.

The temperature development of the wheel bearing and/or of the brake system in wheel hub arrangements is an indication of whether or not the driving operation is error-free and therewith roadworthy and safe in traffic. Thus, a rise in temperature is frequently a sign of impending failure of a wheel bearing. Furthermore, as a consequence of an intense increase in temperature, damage to a previously sound wheel hub arrangement may occur.

There is therefore the wish to be able to acquire the temperature developments of wheel hub arrangements during driving operation and to evaluate them, for example, via ESB electronics or separately and, in the event of hazard, to alert the motor vehicle driver. For example, DE 102 39 695 C1 proposes providing a temperature sensor for monitoring the temperature during operation in the motor winding of a servomotor of a brake application device. This temperature sensor can provide a control and regulation device with corresponding signals via a signal line. Additional components of the brake application device can also be provided with temperature sensors for monitoring the temperature.

DE 197 13 998 A1 similarly proposes a test stand to determine the service life of wheel bearings, in which the temperature of the of the wheel bearing functioning as the equipment under test is determined by a wheel bearing temperature measuring instrument in the proximity of the bearing.

While these known systems have the advantage that an early warning of the motor vehicle operator can take place before a possible failure of a wheel bearing arrangement, however, in practice such systems have been found to be highly complex, since the towing vehicle as well as also potential trailers must be equipped on all wheels or axle ends with corresponding sensors.

In addition, a device warning the motor vehicle operator must be provided in the towing motor vehicle. It is particularly difficult to match towing vehicles with trailers of different manufacturers and/or models. Such a system is, moreover, disproportionately expensive, since, according to present experience, an immediate warning is not required when or after a temperature has been exceeded.

DE 102 42 199 A1 discloses a wheel bearing with which means for acquiring the temperature are associated. For this purpose on a sleeve disposed between two wheel bearings a thermospot is provided, which spot, upon reaching a defined temperature, irreversibly alters its color by melting a monochromatic layer. This thermospot is so disposed that it only becomes visible during maintenance of the wheel bearing. However, even in the case of maintenance work carried out routinely, damage to the wheel bearing may have already occurred if the thermospot is only checked during maintenance work. Due to contaminations, it is moreover possible that a color alteration in the known wheel bearing is not detectable at all or only with difficulty.

The present invention therefore addresses the problem of providing a wheel hub arrangement of the type described in the introduction, in which the indication of a temperature loading unusual in operation and therewith dangerous, can already be readily detected and indicated cost-effectively and independently of the type of motor vehicle during an inspection walk around the motor vehicle.

According to the invention this problem is substantially solved thereby that assigned to the axle end is an indicator device visible from the outside of the wheel hub arrangement, and therewith from outside the motor vehicle, for indicating a critical temperature loading of the wheel bearing and/or of the brake system, and that this indicator device comprises an indicator element which is deformed when a critical temperature load is exceeded. The temperature increases occurring, for example, upon a malfunction in a wheel bearing and/or the brake system cause after a slight time delay also a corresponding temperature rise in the axle end of the axle beam or in its immediate surrounding. It becomes hereby feasible to utilize as a measuring variable the radiative heat generated in the center of the partially hollow axle end at the least possible distance to the inner contour of the axle end.

Thereby that the indicator device for indicating the critical temperature loading is associated with the axle end, the expensive and complex realization of a temperature acquisition through a sensor connected via signal lines with further apparatus becomes superfluous. Rather, it is feasible to indicate the occurrence of critical temperature loading directly at the site at which the increased temperature loading occurs. Since a motor vehicle operator of commercial trucks or the like is customarily obligated to undertake a walk around his vehicle before starting the drive in order to visually check for potentially present damages or impermissible alterations, the indicator device can herein be checked and a critical temperature loading which possibly has occurred the previous day can be detected. These check intervals are to be considered highly sufficient in order to safely avoid hazard exposures resulting from damage of a wheel hub arrangement. After detecting such critical temperature loading, the wheel hub arrangement, and in particular the wheel bearing and/or the brake system, can be checked.

The deformation of the indicator element permits a vehicle operator to detect on sight whether or not critical temperature loading has occurred at the wheel hub arrangement. With this embodiment it is consequently not necessary to read a measuring scale or to perform the like complex examinations. However, this may take place if the exact determination of the occurred temperatures in the wheel hub arrangement is of interest. Similarly, disassembling of components of the wheel hub arrangement is also not required in order to detect critical temperature loading. In addition to the indicator element deforming upon exceeding a critical temperature loading, the indication can also be attained, for example, via a temperature-dependent color changeover or color alteration or the like.

The deformation of an indicator element upon exceeding a critical temperature loading can be attained thereby that the indicator device comprises a closed container which is at least partially filled with a fluid expanding upon being heated. The dimensioning of the container as well as the volume and type of fluid can be so matched to one another that the expanding fluid causes the deformation of the indicator element at a predetermined critical temperature loading. The indicator element can be formed by the container itself and/or by a cover of the container.

To attain a compact structural shape of the wheel hub arrangement according to the invention and to lead to as prompt as possible a response of the indicator device, it is preferred to have the indicator device project at least partially into the axle end. A recess and/or a cavity to receive at least partially the indicator device can for this purpose be developed in the axle end.

A wheel hub cap is conventionally provided in wheel hub arrangements, which cap covers at least partially the wheel hub and/or the axle end. The indicator element deforming when a critical temperature loading is exceeded can therein be formed by the hub cap and/or by a region of the hub cap and the container and/or its cover can be integrated in, set into or be connected in other suitable manner with the hub cap. The indication of the critical temperature loading by an at least regionally deformed hub cap is herein especially readily detectable from the outside.

A further development of this inventive concept provides that the hub cap and/or a region of the hub cap is connected with a closed container and/or as a cover is set onto a container covering the latter. As explained above, this container can be filled with a fluid expanding upon being heated, such that at a temperature heating of the fluid contained in the container it expands and deforms the hub cap or a defined region of the hub cap.

It is herein preferred if the hub cap and/or a cover of the container includes a weakened region and/or a rated yield point. It becomes feasible in this way to generate a defined deformation of the hub cap or of the cover as a consequence of the temperature change.

To avoid that briefly exceeding a critical temperature loading is not indicated or at least not manifestly enough, it is preferred if the hub cap or a region of the hub cap and/or a cover of the container irreversibly bulges out when the critical temperature loading is exceeded. Alternatively, it is also feasible that the hub cap or a region of the hub cap and/or a cover of the container bursts open or bursts off when the critical temperature loading is exceeded. Such a deformation of the hub cap or of the cover can also be immediately detected during a cursory walk around the motor vehicle.

A further embodiment of the invention provides that in the hub cap a piston is displaceably supported such that the piston is at least partially displaceable out of the hub cap when a critical temperature loading is exceeded. This piston can therein be located in and/or on the fluid-filled container or it can be connected with such a container in suitable manner, such that the expansion of the fluid contained in the container causes the displacement of the piston. Similarly to the signal pin of a pressure cooker, the piston, consequently, indicates that a specific temperature loading has been reached or that a pressure increase in the container has been generated thereby.

To permit rapid response of the indicator device of the wheel hub arrangement according to the invention, the axle end and the indicator device are preferably in heat-conducting contact. This can, for example, take place thereby that the axle end and the indicator device are in areal contact or between them a heat-conducting substance is disposed. Alternatively or additionally hereto, heat-conducting ribs may also be provided which transfer a temperature increase in the axle [journal] end at and/or into the container and the indicator device.

If malfunctions in the wheel bearing and/or the brake system occur during driving operation which lead to a temperature increase, the indicator element becomes deformed when a critical temperature loading has been reached preferably initially irreversibly in that it bulges out and/or is partially pushed out of the container and/or out of the hub cap. If driving is nevertheless continued in spite of the malfunction, the operating temperature increases further, such that the indicator element becomes further deformed when the critical temperature loading is exceeded, in particular bursts open and/or off at a rated yield point. It becomes hereby possible to differentiate between damage which occurred only recently and/or minor damage and a malfunction of longer duration or greater severity.

The critical temperature loading which causes a response of the indicator element should be above the temperature loading which occurs during driving with sound wheel bearings and sound brake system. It must herein be taken into consideration that during normal driving operation without damage of the wheel bearings and of the brake system under high brake stress, for example due to relatively long downhill driving, temperature increases in the region of the axle end occur, which are, however, below those which occur with damage to the wheel bearings or the brake system.

According to a further embodiment of the invention the wheel hub arrangement can also be formed such that the color of at least one element of the indicator device alters when a critical deformation has been exceeded. Such a color changeover or color alteration can be detected better from the outside during a check of the motor vehicle than a mere deformation of a structural part. Damage in the proximity of the wheel bearings or of the brake system can consequently be detected at an early time.

Further developments, advantages and application feasibilities of the invention are also evident in the following description of embodiment examples and the drawing. All described and/or graphically shown characteristics form by themselves or in any combination the subject matter of the invention independently of their combination in the claims or their reference back.

THE DRAWING DEPICTS SCHEMATICALLY

Figure 2:
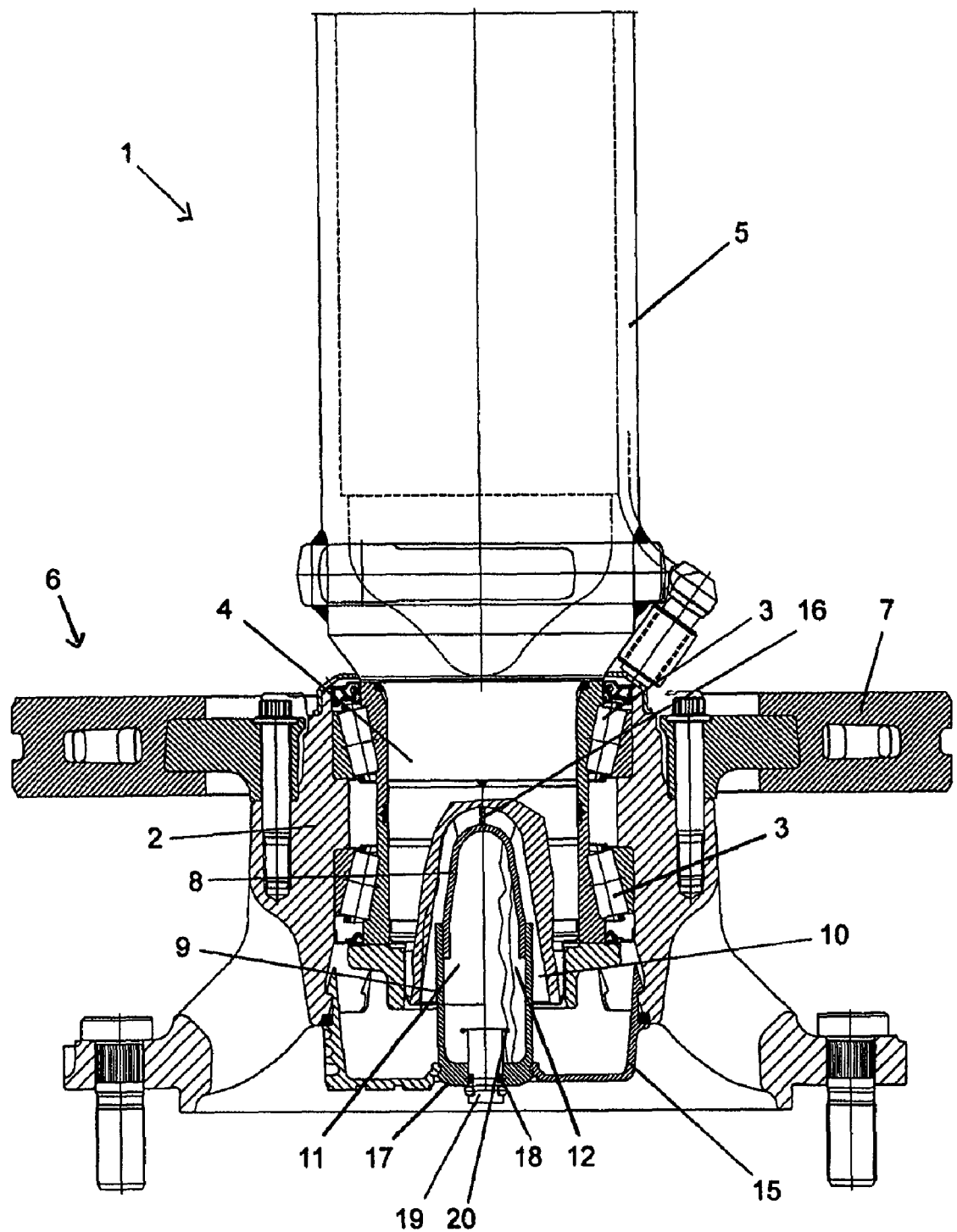
Figure 3:
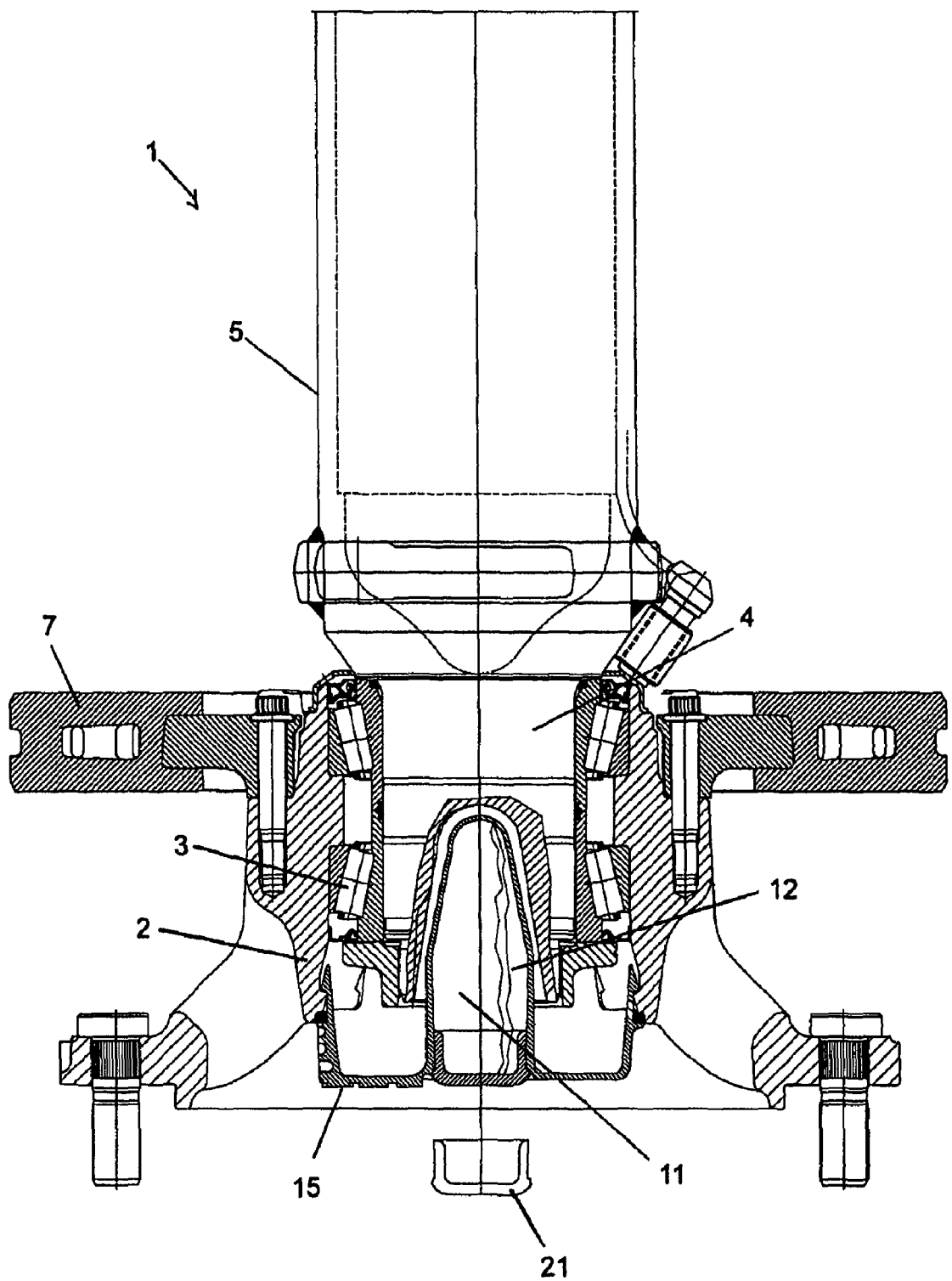

FIG. 1 in sectional view a wheel hub arrangement according to a first embodiment of the invention, FIG. 2 in sectional view a wheel hub arrangement according to a second embodiment of the invention, and FIG. 3 in sectional view a wheel hub arrangement according to a third embodiment of the invention.

The wheel hub arrangement 1 depicted in the Figures is formed substantially by a wheel hub 2, which is bearing supported via a wheel bearing 3 rotatably on an axle [journal] end 4. The wheel bearing 3 in the embodiments shown in the Figures is formed by a double tapered cone bearing in O-configuration. The axle end 4 is integral with an axle beam 5 which in a manner known per se is supported via, for example, (not shown) radius arms on a motor vehicle chassis. The wheel hub arrangement 1 comprises further a brake system 6 with a brake disc 7 connected torsion-tight with the wheel hub, the brake linings and the disc brake caliper for reasons of clarity are not shown in the Figures.

In the axle end 4 in the embodiment according to FIG. 1 a container is formed by a first container element 8 and a second container element 9 in a central cavity 10. The cavity 10 extends in the axle end 4 at least up into the proximity of the wheel bearing 3. The hemispherical end of the first container element 8 of container 11 is nested closely to the bottom of the cavity 10 developed with a similar contour in order to make feasible in this way good heat conduction between the axle end 4 and the container 11. The first container element 8 and the second container element 9 are connected under sealing with one another such that container 11 forms a closed pressure chamber in which a fluid is contained which expands upon being heated.

On the side facing away from the axle beam 5 the container 11 is closed off by a cover 13 of the second container element 9, which may have a rated yield point 14. The cover 13, which in the depicted embodiment is developed unitarily with the second container element 9, initially bulges out irreversibly upon an expansion of the fluid contained in the container as a consequence of a temperature increase which is above the temperature loading occurring with high brake stress, for example, during relatively long downhill travel. If the driving operation is continued further, the temperature increased further such that the rated yield point 14 may burst open whereby the fluid 12 can escape from the container 11.

The cover 13, together with the container 11, is received in a hub cap 15 which outwardly covers the axle end and the wheel bearing 3 on the side facing away from the axle beam 5. In the state in which it is not outwardly bulging the cover 13 is at least approximately in a plane with the hub cap 15. When the cover 13 is bulging, it projects, as indicated in FIG. 1, beyond the hub cap 15 such that this deformation of cover 13 is readily detectable from the outside.

Container 11, fluid 12 and the formation of cover 13 or of the second container element 9 are matched to one another such that when a predetermined critical temperature loading is exceeded, which, for example, may be a sign of impending breakdown of the wheel bearing 3, the heat from the wheel bearing 3 is transferred via the axle end 4 onto the container 11 in which the fluid 12 expands such that the cover 13 is irreversibly bulged outwardly and that with further temperature rise due to continued driving operation after breaking of the rated yield point 14, the fluid 12 escapes from the container 11. Cover 13 thus forms an indicator device to indicate the critical temperature loading of the wheel bearing 3. In the same manner a critical temperature loading of the brake system 6 can also be indicated through the cover 13 or the second container element 9, respectively.

A second embodiment of a wheel hub arrangement 1 according to the invention is depicted in FIG. 2. The axle end 4, the wheel bearing 3, the wheel hub 2 and the brake system 6 have herein the structure explained above with reference to FIG. 1. In the embodiment according to FIG. 2 a hub cap 15 is also provided which covers the axle end 4 and the wheel bearing 3.

In the central cavity 10 of axle end 4 heat-conducting ribs 16 are developed which are connected with the first container element 8 of container 11, which container is at least partially filled with a fluid 12 expanding upon being heated. The heat conducting ribs 16 can also extend up to the bottom of cavity 10 and adapt to the bottom shape during the first revolution of the wheel. The heat transfer can hereby be improved. The container 11 is closed off under sealing through the first container element 8 and the second container element 9 connected pressure-tight with it. On the side facing away from the axle beam 5 is formed a cover 17 integrally in the second container element 9, which cover is at least approximately in one plane with the hub cap 15. In this cover 17 of container 11 a piston 19 is displaceably supported via a sealing 18. The piston 19 is herein connected with its piston margin 20 with the container 11 via a rated yield margin.

Container 11, fluid 12 and piston 19 with the rated yield margin are herein so matched to one another that with a critical temperature loading in the axle end 4, due to a temperature increase in the wheel bearing 3 and/or the brake system 6, the piston 19 is initially pressed outwardly whereby the fact that a critical operating temperature has been reached is already being signaled. If, in spite of damage on the wheel bearing 3 or the brake system, driving operation is continued, the temperature increases further and thereby also the pressure in the container 11, such that the piston margin 20 as a rated yield margin is broken open through the internal pressure of the fluid 12 in container 11. The piston 19 is hereby further displaced out of the container or the cover 17, i.e. away from the axle beam 5. At this point the piston 19 projects already markedly from the hub cap 15 such that the piston 19 forms the indicator element of an indicator device which indicates a critical temperature loading of the wheel bearing 3 and/or of the brake system 6. The piston 19 can optionally even be pressed completely out of the container of the hub cap and in this case is lost.

A further embodiment of the wheel hub arrangement according to the invention is depicted in FIG. 3, with the wheel hub arrangement having fundamentally a similar structure as explained above with reference to FIGS. 1 and 2.

Into the central cavity 10 of the axle end 4, again, a container 11 is set which is filled with a fluid 12 expanding under heat. The container 11, in contrast to the embodiments described above, is formed as an indentation in the hub cap 15 with which container 11 is formed integrally.

Container 11 is closed with a separate cover 21, which, in this state is at least approximately in a plane with the hub cap 15, which covers the axle end 4 and the wheel bearing 3. Cover 21 is so set into container 11 that under normal driving operation it does not detach from the container 11.

On the other hand, cover 21, as indicated in FIG. 3, can be pressed out of container 11 if the fluid 12 contained in the container is heated above a critical temperature loading due to the heating of the wheel bearing and/or of the brake system 6. In this case cover 21 falls from container 11 and the hub cap 15 such that it is possible to detect rapidly that a critical temperature loading had been reached.

In the embodiment according to FIG. 3 container 11 is formed by a one-piece closed cylinder which is received in the cavity 10 of the axle end 4. However, alternatively, the container 11 can also be formed of several components, as, for example, depicted in the embodiments according to FIG. 1 and 2, or conversely.

Container 11 and/or an optionally provided cover 13, 17, 21 can be comprised of a synthetic material or another suitable material. As the fluid 12 expanding under heat, water can, for example, be utilized. However, alternatively, it is also feasible to utilize another liquid or gaseous fluid which is selected with respect to its expansion upon possible changes of the temperature due to damage of the wheel hub arrangement 1.

Instead of a container 11 filled with a liquid or gaseous medium 12, a solid body can also be provided which expands when the wheel hub arrangement is heated and therein deforms an indicator element, for example, a cover or the hub cap 15.

According to the invention in all described embodiments the container 11 is in close contact with the hub cap 15 and the axle end 4, for example through the heat-conducting ribs 16 or the potentially very short distance between the cavity 10 and the container. Hereby good heat conduction between the axle end 4 and the indicator device for the indication of a critical temperature loading of the wheel bearing 3 and/or of the brake system 6 is feasible, which ensures an especially rapid response of the indicator device. Possible damages can thus be detected in time, before further defects occur, for example due to high temperature loading. Moreover, different damage stages, which temperature loadings of different levels generate, can be made visible with simple means, for example through the deformation of an element of the indicator device at minor temperature increase and a bursting off of an element of the indicator device or through color changeovers at greater temperature increases.

LIST OF REFERENCE NUMBERS

| | |
|---|---|
| 1 | Wheel hub arrangement |
| 2 | Wheel hub |
| 3 | Wheel bearing |
| 4 | Axle [journal] end |
| 5 | Axle beam |
| 6 | Brake system |
| 7 | Brake disc |
| 8 | First container element |
| 9 | Second container element |
| 10 | Cavity |
| 11 | Container (pressure chamber) |
| 12 | Fluid |
| 13 | Cover |
| 14 | Rated yield point |
| 15 | Hub cap |
| 16 | Heat-conducting rib |
| 17 | Cover |
| 18 | Sealing |
| 19 | Piston |
| 20 | Piston margin (rated yield margin) |
| 21 | Cover |

The invention claimed is:

1. A wheel hub arrangement, comprising:
at least one wheel hub;
at least one wheel bearing;
an axle beam adapted to be supported on a motor vehicle chassis, wherein the at least one wheel hub is rotatably supported on an end of the axle by the at least one wheel bearing;
a brake system adapted to be supported by the motor vehicle chassis; and
an indicator device visible from an outside of the at least one wheel hub for indicating a critical temperature loading of at least a select one of the at least one wheel bearing and the brake system, wherein the indicator device comprises an indicator element that becomes deformed if the critical temperature loading is exceeded, wherein the indicator device further comprises a solid body that expands when heated, and wherein direct impingement of the solid body against the indicator element causes the deformation of the indicator element by causing a change in the shape of the indicator element.

2. The wheel hub arrangement as claimed in claim 1, wherein the indicator device is at least partially integrated into the end of the axle.

3. The wheel hub arrangement as claimed in claim 1, wherein the end of the axle includes a recess that at least partially receives the indicator device therein.

4. The wheel hub arrangement as claimed in claim 1, wherein the indicator element comprises at least a portion of a hub cap.

5. The wheel hub arrangement as claimed in claim 4, wherein the at least a portion of the hub cap includes at least a select one of a weakened region and rated yield point.

6. The wheel hub arrangement as claimed in claim 4, wherein the at least a portion of the hub cap irreversibly deforms when the critical temperature loading is exceeded.

7. The wheel hub arrangement as claimed in claim 4, wherein the at least a portion of the hub cap ruptures when the critical temperature loading is exceeded.

8. The wheel hub arrangement as claimed in claim 4, wherein the indicator element further includes a piston supported such that the piston is at least partially displaceable out of the hub cap when the critical temperature loading is exceeded.

9. The wheel hub arrangement as claimed in claim 1, wherein the axle and the indicator device are in thermodynamic communication with one another through at least a select one of areal contact and at least one heat-conducting rib.

10. The wheel hub arrangement as claimed in claim 1, wherein the indicator element irreversibly deforms upon reaching the critical temperature loading.

11. The wheel hub arrangement as claimed in claim 1, wherein the critical temperature loading comprises a temperature that is greater than a temperature loading occurring during normal driving operation.

12. The wheel hub arrangement as claimed in claim 1, wherein a color of the indicator element is altered when the critical temperature loading is exceeded.

13. The wheel hub arrangement as claimed in claim 1, wherein a color of the indicator element is altered when a critical temperature loading of the wheel bearing is exceeded.

* * * * *